(12) United States Patent
Mankovski

(10) Patent No.: US 8,171,474 B2
(45) Date of Patent: May 1, 2012

(54) SYSTEM AND METHOD FOR MANAGING, SCHEDULING, CONTROLLING AND MONITORING EXECUTION OF JOBS BY A JOB SCHEDULER UTILIZING A PUBLISH/SUBSCRIPTION INTERFACE

(76) Inventor: Serguei Mankovski, Markham (CA)

( * ) Notice: Subject to any disclaimer, the term of this patent is extended or adjusted under 35 U.S.C. 154(b) by 1446 days.

(21) Appl. No.: 11/239,335

(22) Filed: Sep. 30, 2005

(65) Prior Publication Data

US 2006/0095914 A1    May 4, 2006

Related U.S. Application Data

(60) Provisional application No. 60/614,493, filed on Oct. 1, 2004.

(51) Int. Cl.
*G06F 9/46* (2006.01)
(52) U.S. Cl. .......... 718/100; 718/102; 718/104
(58) Field of Classification Search .......... 718/100, 718/102, 104
See application file for complete search history.

(56) References Cited

U.S. PATENT DOCUMENTS

| | | | |
|---|---|---|---|
| 4,031,512 A | 6/1977 | Faber | 340/147 R |
| 4,318,173 A | 3/1982 | Freedman et al. | 364/200 |
| 4,323,966 A | 4/1982 | Whiteside et al. | 364/200 |
| 4,642,756 A | 2/1987 | Sherrod | 364/200 |
| 4,685,122 A | 8/1987 | Deveson et al. | 379/90 |
| 4,805,107 A | 2/1989 | Kieckhafer et al. | 364/200 |
| 4,855,899 A | 8/1989 | Presant | 364/200 |
| 4,914,657 A | 4/1990 | Walter et al. | 371/11.3 |
| 4,969,092 A | 11/1990 | Shorter | 364/200 |
| 5,012,409 A | 4/1991 | Fletcher et al. | 364/200 |
| 5,303,369 A | 4/1994 | Borcherding et al. | 395/650 |
| 5,371,887 A * | 12/1994 | Yoshida et al. | 718/107 |
| 5,414,845 A | 5/1995 | Behm et al. | 395/650 |
| 5,418,953 A | 5/1995 | Hunt et al. | 395/650 |
| 5,487,170 A | 1/1996 | Bass et al. | 395/732 |
| 5,495,610 A | 2/1996 | Shing et al. | 395/600 |

(Continued)

FOREIGN PATENT DOCUMENTS

AU    200071123    3/2001

(Continued)

OTHER PUBLICATIONS

Pietzuch et al., "Peer-to-Peer Overlay Broker Networks in an Event-Based Middleware", *Distributed Event-Based Systems: Proceedings of the 2nd International Workshop on Distributed Event-Based System*, Jun. 8, 2003, 8 pages.

(Continued)

*Primary Examiner* — Meng An
*Assistant Examiner* — Tammy Lee
(74) *Attorney, Agent, or Firm* — Pillsbury Winthrop Shaw Pittman LLP

(57) ABSTRACT

The invention relates to a system and a method for tracking and executing a job comprising a series of tasks. Each task may be executed on a separate computing device. The method comprises having a workload manager to identify an initial schedule of implementation for the job; having agents to selectively control execution of the tasks; and utilizing a publish/subscription interface between the workload manager and the agents to isolate the communications of the workload manager from the agents. The workload manager and the agents each subscribe and schedule execution of and reporting of the tasks through the publish/subscription interface.

24 Claims, 12 Drawing Sheets

U.S. PATENT DOCUMENTS

| | | | |
|---|---|---|---|
| 5,655,081 A | 8/1997 | Bonnell et al. | 395/200.32 |
| 5,701,439 A | 12/1997 | James et al. | 395/500 |
| 5,781,775 A | 7/1998 | Ueno | 395/672 |
| 5,787,280 A | 7/1998 | Joseph et al. | 395/619 |
| 5,812,849 A | 9/1998 | Nykiel et al. | 395/701 |
| 5,826,104 A | 10/1998 | Rifkin | 395/835 |
| 5,862,386 A | 1/1999 | Joseph et al. | 395/712 |
| 5,872,970 A | 2/1999 | Pickett et al. | 395/671 |
| 5,881,283 A | 3/1999 | Hondou et al. | 395/670 |
| 5,881,284 A | 3/1999 | Kubo | 395/675 |
| 5,901,313 A | 5/1999 | Wolf et al. | 395/682 |
| 5,907,705 A | 5/1999 | Carter | 395/701 |
| 5,940,813 A | 8/1999 | Hutchings | 705/43 |
| 5,978,594 A | 11/1999 | Bonnell et al. | 395/837 |
| 6,014,760 A | 1/2000 | Silva et al. | 714/46 |
| 6,029,178 A | 2/2000 | Martin et al. | 707/201 |
| 6,035,278 A | 3/2000 | Mansour | 705/9 |
| 6,035,307 A | 3/2000 | Martin et al. | 707/203 |
| 6,035,419 A | 3/2000 | Breslau et al. | 714/20 |
| 6,065,123 A * | 5/2000 | Chou et al. | 713/322 |
| 6,076,174 A * | 6/2000 | Freund | 714/47 |
| 6,097,886 A | 8/2000 | Dave et al. | 395/500.44 |
| 6,105,148 A | 8/2000 | Chung et al. | 714/16 |
| 6,112,023 A | 8/2000 | Dave et al. | 395/500.48 |
| 6,141,412 A | 10/2000 | Smith et al. | 379/265 |
| 6,151,707 A | 11/2000 | Hecksel et al. | 717/11 |
| 6,154,878 A | 11/2000 | Saboff | 717/11 |
| 6,178,542 B1 | 1/2001 | Dave | 716/18 |
| 6,195,699 B1 | 2/2001 | Dennis | 709/229 |
| 6,205,122 B1 | 3/2001 | Sharon et al. | 370/254 |
| 6,253,236 B1 | 6/2001 | Troxel et al. | 709/217 |
| 6,263,359 B1 | 7/2001 | Fong et al. | 709/103 |
| 6,263,377 B1 | 7/2001 | Monday et al. | 709/320 |
| 6,314,428 B1 | 11/2001 | Brew et al. | 707/103 |
| 6,323,882 B1 | 11/2001 | Jerome et al. | 345/744 |
| 6,324,578 B1 | 11/2001 | Cox et al. | 709/223 |
| 6,336,217 B1 | 1/2002 | D'Anjou et al. | 717/11 |
| 6,338,149 B1 | 1/2002 | Ciccone, Jr. et al. | 714/38 |
| 6,393,605 B1 | 5/2002 | Loomans | 717/121 |
| 6,427,170 B1 | 7/2002 | Sitaraman et al. | 709/226 |
| 6,430,594 B1 | 8/2002 | Akiyama et al. | 709/108 |
| 6,449,739 B1 | 9/2002 | Landan | 714/47 |
| 6,457,049 B2 | 9/2002 | Lewis et al. | 709/223 |
| 6,457,170 B1 | 9/2002 | Boehm et al. | 717/106 |
| 6,480,834 B1 | 11/2002 | Engle et al. | 707/2 |
| 6,493,594 B1 | 12/2002 | Kraml | 700/19 |
| 6,510,466 B1 | 1/2003 | Cox et al. | 709/229 |
| 6,516,318 B2 | 2/2003 | Nakamura et al. | 707/10 |
| 6,546,364 B1 | 4/2003 | Smirnov et al. | 703/22 |
| 6,546,387 B1 | 4/2003 | Triggs | 707/5 |
| 6,550,024 B1 | 4/2003 | Pagurek et al. | 714/47 |
| 6,591,290 B1 | 7/2003 | Clarisse et al. | 709/205 |
| 6,591,413 B1 | 7/2003 | Humphrey et al. | 717/125 |
| 6,606,529 B1 | 8/2003 | Crowder, Jr. et al. | 700/104 |
| 6,678,682 B1 | 1/2004 | Jenkins et al. | 707/9 |
| 6,691,067 B1 | 2/2004 | Ding et al. | 702/186 |
| 6,691,125 B1 | 2/2004 | Engle et al. | 707/102 |
| 6,718,486 B1 | 4/2004 | Roselli et al. | 714/41 |
| 6,721,778 B1 | 4/2004 | Smith et al. | 709/103 |
| 6,738,806 B1 | 5/2004 | Maryka et al. | 709/220 |
| 6,738,813 B1 | 5/2004 | Reichman | 709/224 |
| 6,748,451 B2 | 6/2004 | Woods et al. | 709/248 |
| 6,757,689 B2 | 6/2004 | Battas et al. | 707/101 |
| 6,769,120 B1 | 7/2004 | Rodriguez | 718/100 |
| 6,772,411 B2 | 8/2004 | Hayes et al. | 717/127 |
| 6,779,028 B1 | 8/2004 | Nakamura | 709/223 |
| 6,801,926 B1 | 10/2004 | Shisler et al. | 709/201 |
| 6,809,251 B2 | 10/2004 | Dinwoodie | 136/244 |
| 6,847,970 B2 * | 1/2005 | Keller et al. | 707/100 |
| 6,868,542 B1 | 3/2005 | Hebert et al. | 719/316 |
| 6,889,243 B1 | 5/2005 | Hondou et al. | 709/100 |
| 6,895,586 B1 | 5/2005 | Brasher et al. | 719/313 |
| 6,901,435 B1 | 5/2005 | Sulcer et al. | 709/219 |
| 6,915,285 B2 | 7/2005 | Gray et al. | 706/49 |
| 6,922,827 B2 | 7/2005 | Vasilik et al. | 717/140 |
| 6,925,482 B2 | 8/2005 | Gopal et al. | 709/201 |
| 6,934,931 B2 | 8/2005 | Plumer et al. | 717/104 |
| 6,934,949 B2 | 8/2005 | Smith et al. | 718/101 |
| 6,944,630 B2 | 9/2005 | Vos et al. | 707/104.1 |
| 6,971,094 B1 | 11/2005 | Ly | 717/172 |
| 6,976,133 B1 | 12/2005 | Wynn et al. | 711/147 |
| 6,983,321 B2 | 1/2006 | Trinon et al. | 709/224 |
| 6,986,135 B2 | 1/2006 | Leathers et al. | 717/177 |
| 6,993,763 B2 | 1/2006 | Hayes, Jr. | 718/102 |
| 6,996,576 B2 | 2/2006 | Vos et al. | 707/103 |
| 6,996,601 B1 | 2/2006 | Smith | 709/203 |
| 7,020,880 B2 * | 3/2006 | Mellen-Garnett et al. | 719/310 |
| 7,055,170 B1 | 5/2006 | Karmouch et al. | 726/2 |
| 7,082,604 B2 * | 7/2006 | Schneiderman | 718/100 |
| 7,082,605 B2 * | 7/2006 | Alletson et al. | 718/100 |
| 7,240,015 B1 | 7/2007 | Karmouch et al. | 705/4 |
| 7,240,324 B2 | 7/2007 | Casati et al. | 717/103 |
| 7,404,189 B2 * | 7/2008 | Benedetti | 719/317 |
| 7,472,905 B2 | 1/2009 | Inoue | 271/227 |
| 7,650,347 B2 | 1/2010 | Mankovski et al. | 707/100 |
| 7,657,450 B2 * | 2/2010 | Amit et al. | 705/7.26 |
| 2001/0018708 A1 | 8/2001 | Shisler et al. | 709/220 |
| 2001/0028368 A1 | 10/2001 | Swartz et al. | 345/835 |
| 2001/0032263 A1 | 10/2001 | Gopal et al. | 709/227 |
| 2001/0042131 A1 | 11/2001 | Mathon et al. | 709/238 |
| 2001/0049595 A1 | 12/2001 | Plumer et al. | 703/22 |
| 2002/0002578 A1 | 1/2002 | Yamashita | 709/105 |
| 2002/0007297 A1 | 1/2002 | Clarke | 705/8 |
| 2002/0023122 A1 | 2/2002 | Polizzi et al. | 709/202 |
| 2002/0049815 A1 | 4/2002 | Dattatri | 709/206 |
| 2002/0082891 A1 | 6/2002 | McKay et al. | 705/8 |
| 2002/0107957 A1 | 8/2002 | Zargham et al. | 709/224 |
| 2002/0124245 A1 | 9/2002 | Maddux et al. | 717/176 |
| 2002/0129035 A1 | 9/2002 | Hayes et al. | 707/104.1 |
| 2002/0129129 A1 | 9/2002 | Bloch et al. | 709/220 |
| 2002/0133622 A1 | 9/2002 | Pinto | 709/242 |
| 2002/0143669 A1 | 10/2002 | Scheer | 705/28 |
| 2002/0143920 A1 | 10/2002 | Dev et al. | 709/223 |
| 2002/0161674 A1 | 10/2002 | Scheer | 705/28 |
| 2002/0161814 A1 | 10/2002 | Wical | 709/101 |
| 2002/0165903 A1 | 11/2002 | Zargham et al. | 709/202 |
| 2002/0165976 A1 | 11/2002 | Gonthier et al. | 709/237 |
| 2002/0178262 A1 * | 11/2002 | Bonnell et al. | 709/225 |
| 2002/0178349 A1 | 11/2002 | Shibayama et al. | 712/235 |
| 2002/0184070 A1 | 12/2002 | Chen et al. | 705/9 |
| 2002/0184575 A1 | 12/2002 | Landan | 714/47 |
| 2002/0198923 A1 | 12/2002 | Hayes, Jr. | 709/102 |
| 2003/0009463 A1 | 1/2003 | Gallant | 707/10 |
| 2003/0018509 A1 | 1/2003 | Ossip et al. | 705/9 |
| 2003/0018510 A1 | 1/2003 | Sanches | 705/9 |
| 2003/0018763 A1 | 1/2003 | Doherty et al. | 709/223 |
| 2003/0046681 A1 | 3/2003 | Barturen et al. | 717/177 |
| 2003/0101279 A1 | 5/2003 | Maheshwari | 709/241 |
| 2003/0120704 A1 * | 6/2003 | Tran et al. | 709/104 |
| 2003/0126181 A1 * | 7/2003 | Young | 709/100 |
| 2003/0126303 A1 | 7/2003 | Kadakia et al. | 709/313 |
| 2003/0163511 A1 | 8/2003 | Smith et al. | 709/101 |
| 2003/0163799 A1 | 8/2003 | Vasilik et al. | 717/100 |
| 2003/0182652 A1 | 9/2003 | Custodio | 717/122 |
| 2003/0188290 A1 | 10/2003 | Corral | 717/101 |
| 2003/0191679 A1 | 10/2003 | Casati et al. | 705/8 |
| 2003/0191795 A1 * | 10/2003 | Bernardin et al. | 709/105 |
| 2003/0200098 A1 | 10/2003 | Geipel et al. | 705/1 |
| 2003/0220860 A1 | 11/2003 | Heytens et al. | 705/35 |
| 2004/0028077 A1 | 2/2004 | Gray et al. | 370/466 |
| 2004/0060035 A1 | 3/2004 | Ustaris | 717/100 |
| 2004/0073900 A1 | 4/2004 | Scott | 717/170 |
| 2004/0107179 A1 | 6/2004 | Dalrymple, III et al. | 707/1 |
| 2004/0107199 A1 | 6/2004 | Dalrymple, III et al. | 707/100 |
| 2004/0117802 A1 | 6/2004 | Green | 719/318 |
| 2004/0123296 A1 * | 6/2004 | Challenger et al. | 718/102 |
| 2004/0148184 A1 | 7/2004 | Sadiq | 705/1 |
| 2004/0177108 A1 | 9/2004 | Connelly et al. | 709/201 |
| 2004/0177355 A1 | 9/2004 | Wragge | 717/174 |
| 2004/0181425 A1 | 9/2004 | Schwerin-Wenzel et al. | 705/1 |
| 2004/0187108 A1 * | 9/2004 | Knowles et al. | 718/100 |
| 2004/0216098 A1 | 10/2004 | Roe et al. | 717/161 |
| 2004/0230828 A1 | 11/2004 | DeFuria et al. | 713/200 |
| 2004/0237087 A1 | 11/2004 | Ye et al. | 718/101 |
| 2005/0010608 A1 | 1/2005 | Horikawa | 707/200 |
| 2005/0015437 A1 | 1/2005 | Strait | 709/203 |
| 2005/0015511 A1 | 1/2005 | Izmailov et al. | 709/238 |

| | | | |
|---|---|---|---|
| 2005/0015619 A1 | 1/2005 | Lee ..................................... 726/4 |
| 2005/0039132 A1 | 2/2005 | Germain et al. ............... 715/736 |
| 2005/0044173 A1 | 2/2005 | Olander et al. ................ 709/217 |
| 2005/0049923 A1 | 3/2005 | Tanaka et al. ................... 705/18 |
| 2005/0071818 A1 | 3/2005 | Reissman et al. .............. 717/127 |
| 2005/0081186 A1 | 4/2005 | Tigani et al. ................... 717/104 |
| 2005/0097146 A1 | 5/2005 | Konstantinou et al. ....... 707/200 |
| 2005/0097545 A1 | 5/2005 | Tarbox et al. ................. 717/176 |
| 2005/0108700 A1 | 5/2005 | Chen et al. .................... 717/168 |
| 2005/0108702 A1 | 5/2005 | Baker et al. ................... 717/168 |
| 2005/0114039 A1 | 5/2005 | Kennedy et al. ................ 702/19 |
| 2005/0131865 A1 | 6/2005 | Jones et al. ........................ 707/2 |
| 2005/0160074 A1 | 7/2005 | Vos et al. .......................... 707/1 |
| 2005/0160104 A1 | 7/2005 | Meera et al. ................... 707/100 |
| 2005/0210099 A1 | 9/2005 | Oswalt .......................... 709/203 |
| 2005/0216486 A1 | 9/2005 | Barshefsky et al. ........... 707/100 |
| 2005/0216555 A1 | 9/2005 | English et al. ................ 709/204 |
| 2005/0257216 A1 | 11/2005 | Cornell et al. ................. 717/177 |
| 2005/0257221 A1 | 11/2005 | Inchingolo et al. ............ 718/100 |
| 2005/0262076 A1 | 11/2005 | Voskuil ............................ 707/8 |
| 2005/0262501 A1 | 11/2005 | Marinelli et al. .............. 717/174 |
| 2005/0278703 A1 | 12/2005 | Lo et al. ......................... 717/126 |
| 2006/0010123 A1 | 1/2006 | Sonkin et al. ..................... 707/4 |
| 2007/0006195 A1 | 1/2007 | Braun et al. ................... 717/151 |
| 2007/0266390 A1* | 11/2007 | Emmerich .................... 718/105 |
| 2007/0288412 A1 | 12/2007 | Linehan .......................... 706/45 |
| 2008/0263195 A1 | 10/2008 | Kroll et al. .................... 709/224 |
| 2008/0307420 A1* | 12/2008 | Benedetti ...................... 718/102 |
| 2010/0211815 A1 | 8/2010 | Mankovskii et al. ............. 714/2 |

FOREIGN PATENT DOCUMENTS

| | | |
|---|---|---|
| CA | 2276240 | 11/1997 |
| CH | 306782 | 4/1955 |
| WO | WO 01/16753 | 3/2001 |
| WO | WO 01/20918 | 3/2001 |
| WO | WO 02/23434 | 3/2002 |
| WO | WO 02/063530 | 8/2002 |

OTHER PUBLICATIONS

Barbuceanu, Mihai, et al., "Coordinating with Obligations", University of Toronto, and Mitel Corporation, Sep. 30, 1997, 19 pages.

Buhr, R.J.A., et al., "Feature-Interaction Visualization and Resolution in an Agent Environment", Carleton University and Mitel Corporation, 15 pages.

Dini, Petre, et al., "Policy-Enabled Mechanisms for Feature Interactions: Reality, Expectations, Challenges", *Computer Networks*, vol. 45, 2004, pp. 585-603.

Kretschmer, Martin, "Software as Text and Machine: The Legal Capture of Digital Innovation", *Journal of Information, Law and Technology*, Issue 1, Jul. 4, 2003, 23 pages.

Tcherevik, Dmitri, "A Publish/Subscribe Mechanism for Web Services: Extending an Existing Event Broker", *Web Services Journal*, copyright 2004, SYS-CON Media, Inc., 8 pages.

Wieringa et al., "Applications of Deontic Logic in Computer Science: A Concise Overview", 27 pages.

"Web Services Choreography Requirements", W3C Working Draft, Mar. 11, 2004, W3C, 26 pages.

"Padres: A Distributed Content-Based Publish/Subscribe System for Workflow Management", University of Toronto and Cybermation Inc., Nov. 19, 2004, 20 pages.

Schwartz M., et al., "The APEX Publish-Subscribe Service", Network Working Group, Internet-Draft, Oct. 23, 2001, The Internet Society, 17 pages.

"Enterprise Resource Planning", definition from Wikipedia, 3 pages.

"BPEL—a Whatis.com definition", searchWebServices.com definitions, 2 pages.

Van Der Torre, Leendert W.N., "Violated Obligations in a Defeasible Deontic Logic", ECAI 94, 11th *European Conference on Artificial Intelligence,* edited by A. Cohn, 1994, John Wiley & Sons, Ltd., pp. 371-375.

* cited by examiner

SYSTEM AND METHOD FOR MANAGING, SCHEDULING, CONTROLLING AND MONITORING EXECUTION OF JOBS BY A JOB SCHEDULER UTILIZING A PUBLISH/SUBSCRIPTION INTERFACE

RELATED APPLICATION

This application claims the benefit of U.S. Provisional Patent Application Ser. No. 60/614,493, entitled "System and Method for Job Scheduling," filed on Oct. 1, 2004, the contents of which are hereby incorporated by reference in their entirety.

FIELD OF THE INVENTION

The present invention relates to a system and method for managing, scheduling, controlling, and monitoring execution of jobs by a job scheduler.

BACKGROUND

Job scheduling systems provide a centralized system in hardware and software for processing large scale tasks. Typically, large scale tasks are broken down into several smaller tasks which are individually, sequentially and coincidentally executed according to a master task schedule to complete the task. For example, for a large company, a job scheduling system may be used to process its payroll payment. The payroll task may be broken down into the following processes: (i) access the company database for a list of the employees; (ii) execute a payroll program to identify salary payments to be made; (iii) execute a deposit program to make electronic bank deposits of the salary payments to the bank accounts of the employees; (iv) execute a report generator to print and send pay stubs to the employees. The payroll payment may be automated to occur at regular intervals. A job scheduling system utilizes a series of agents generally operating on computers to perform the smaller tasks. A workload manager controls each of the agents. The manager is connected to the agents using a communication network configured in a "star" pattern, with the workload manager at the center and each of the agents on a ray of the star.

In a network based system, agents operate on separate computers and each of the computers communicate to a central computer running the workload manager. IP is a commonly used communication protocol. The workload manager needs to track each agent for its status and job completion. When an agent has a fault, e.g. its communication link is broken, the workload manager must be able to recognize the fault and take corrective action, if possible. For example, upon the detection of a fault in an agent, a backup agent on a different computer may be brought in to take the place of the agent. With large systems having many tasks, it is a non-trivial exercise for the workload manager to track and manage the operation of all of the agents.

With a "star" network configuration, if the agents are allowed to move, there is a need to keep accurate data about the IP addresses of the agents. In practice it is a labor intensive task.

Failover of agents (i.e. providing backup for agents) is difficult to achieve because communication between agents and the workload manager is restricted to one instance of an agent and the workload manager. Further, it is difficult to maintain "shadow" agents and to re-assign schedules to different agents after a schedule has been created.

Under heavy load conditions, the workload manager may be overloaded with events. If it cannot process job events, they are queued and processing is delayed. This reduces overall productivity and reduces utilization of enterprise tools.

Also, the "star" architecture creates a performance bottleneck and a single point of failure. If the manager is down, no workload can be executed at all. Jobs that have to run at the time of failure will be delayed.

There is a need for a system and method which addresses deficiencies in the prior art.

SUMMARY

In a first aspect, a method for tracking and executing a job comprising a series of tasks is provided. Each task may be executed on a separate computing device. The method comprises having a workload manager to identify an initial schedule of implementation for the job; having agents to selectively control execution of the tasks; and utilizing a publish/subscription interface between the workload manager and the agents to isolate the communications of the workload manager from the agents. The workload manager and the agents each subscribe and schedule execution of and reporting of the tasks through the publish/subscription interface.

In a second aspect, a method for tracking and executing a job comprising a series of tasks is provided. Each task may be executed on a separate computing device. The method comprises having a workload manager to identify an initial schedule of implementation for the job; having agents to selectively control execution of the tasks; and utilizing a publish/subscription interface between the workload manager and the agents to isolate the communications of the workload manager from the plurality of agents. The workload manager provides a schedule for the job to the publish/subscription service. Also the agents manage execution of their associated tasks by subscribing to the service for the schedule and extracting the associated tasks from the schedule after it is provided thereto.

In a third aspect, a system implementing any of the above noted aspects is provided.

In other aspects various combinations of sets and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION

Figure 1:
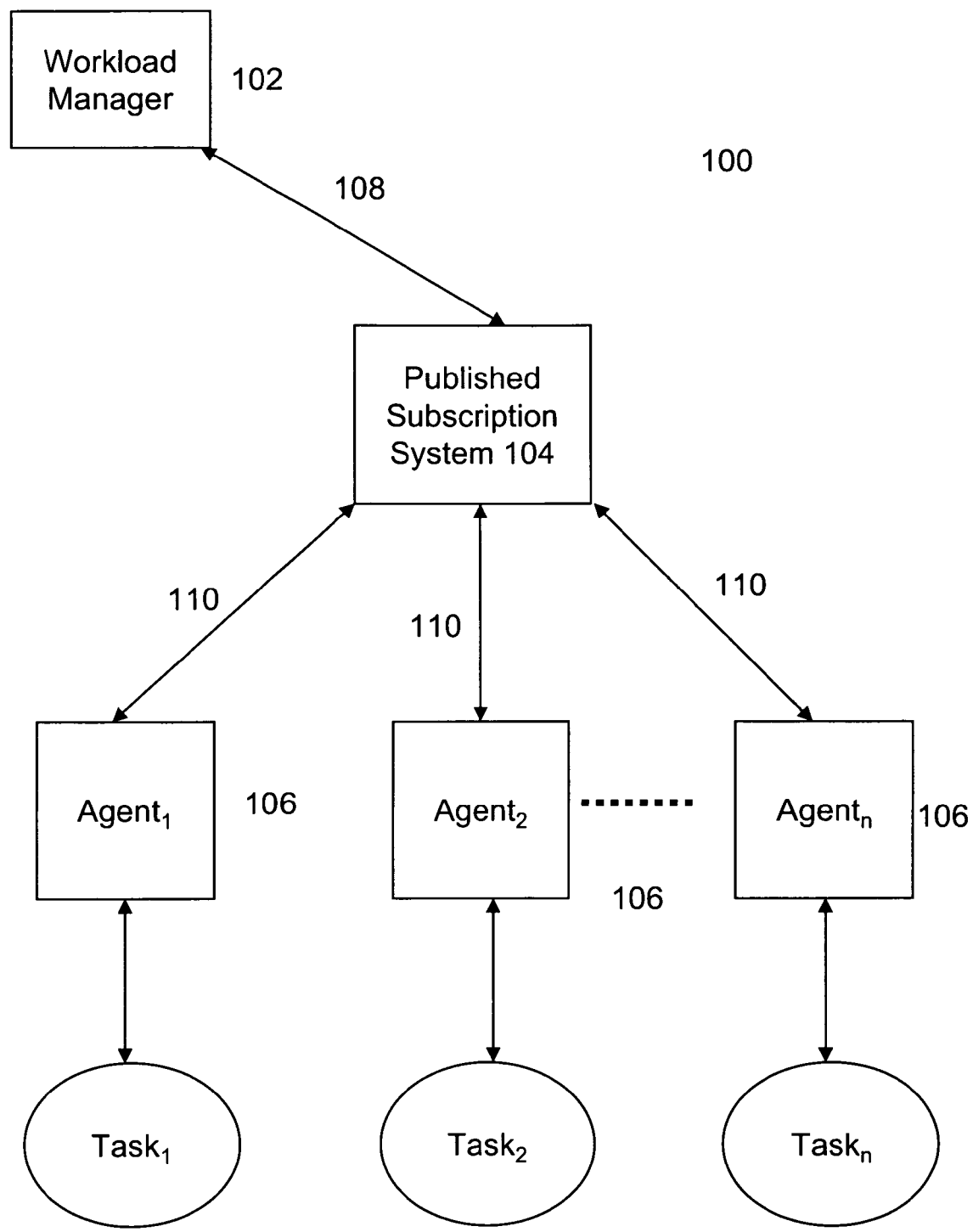
FIG. 1 illustrates a block diagram of job scheduler system providing an embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

In FIG. 1, system 100 illustrates an embodiment and comprises a workload manager (WM) 102, publish/subscription system (PSS) 104 and agents 106. WM 102 communicates with PSS 104 via bidirectional communication link 108. Each agent 106 communicates with PSS 104 via a bidirectional communication link 110. In one embodiment each of WM 102, PSS 104 and agents 106 is a software program and each operates on a separate computer. Each of WM 102, PSS 104 and agents 106 have access to internal and external data and databases (not shown). Communication between elements in system 100 may utilize messages created by a sender and sent over the respective links containing commands and data which can be extracted and acted upon by the recipient.

PSS 104 utilizes a publish/subscribe paradigm, where information producers submit data (as publications) to it and information consumers indicate their interests by submitting subscriptions. On receiving a publication, the system 100 matches the data with the set of clients' subscriptions, notifying the interested parties. This system 100 provides decoupling of publishers and subscribers. This decoupling is useful for job scheduling, as the individual job monitors/controllers, or agents 106, are lightweight and potentially quite numerous. The address-free automatic content-based routing relieves WM 102 of the burden of maintaining connection state information and routing messages to and from all the agents 106.

In the embodiment, PSS 104 is a server for one or more clients. There are at least two types of clients. The first type is a publisher (producer) of events. This is typically WM 102. The second type is a subscriber to (consumer of) events. These are typically agents 106. Subscribing clients send subscriptions to PSS 104. Subscriptions can be in the form of messages and contain any task names, status for tasks, any operating, function, geographic or other pertinent characteristic of the client. For example, the subscription can identify the network location of the client, the operating system resident on the client, the list of agent 106 applications resident on the client, status information, and information about its immediate neighbours, among other things. Publications relate to a status of a task and its task name. For example, publications can relate to a failure of a task or a success of a task and can be published in the publish/subscribe system 100. Publishing client sends publications to PSS 104. PSS 104 matches information extracted from publications to information extracted from subscriptions. When a match is found, the publication is forwarded to all subscribers of the publication. PSS 104 maintains a status list for tasks sent by publishers to it. The status list tracks the tasks and the responsible agent 106 (subscriber) for the tasks.

Figure 2:
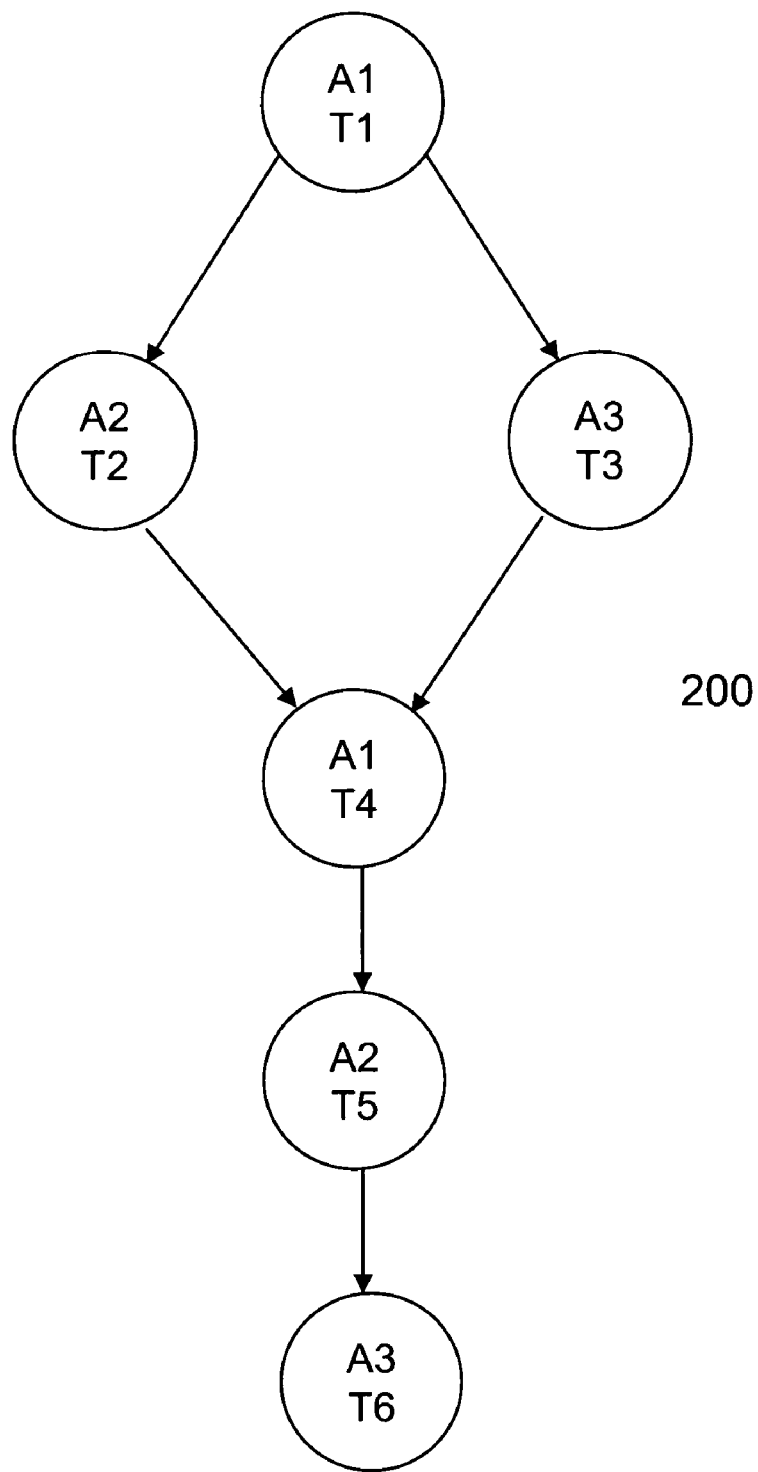
FIG. 2 illustrates an exemplary job provided to the system of FIG. 1 for scheduling and processing.

Referring to FIG. 2, an exemplary job 200 is shown which is executed by system 100. Job 200 comprises tasks performed by agents A1, A2 and A3. At the top of job 200, agent A1 performs its task T1 then tasks T2 and T3 are performed separately and simultaneously by agents A2 and A3. Upon successful completion of the tasks T2 and T3, a further task T4 is performed by agent A1. Subsequently, upon successful completion of task T4, task T5 is performed by agent A2 and upon successful completion of task T5, final task T6 is performed by agent A3. WM 102 and PSS 104 control activation of agents 106 for job 200.

Figure 3:
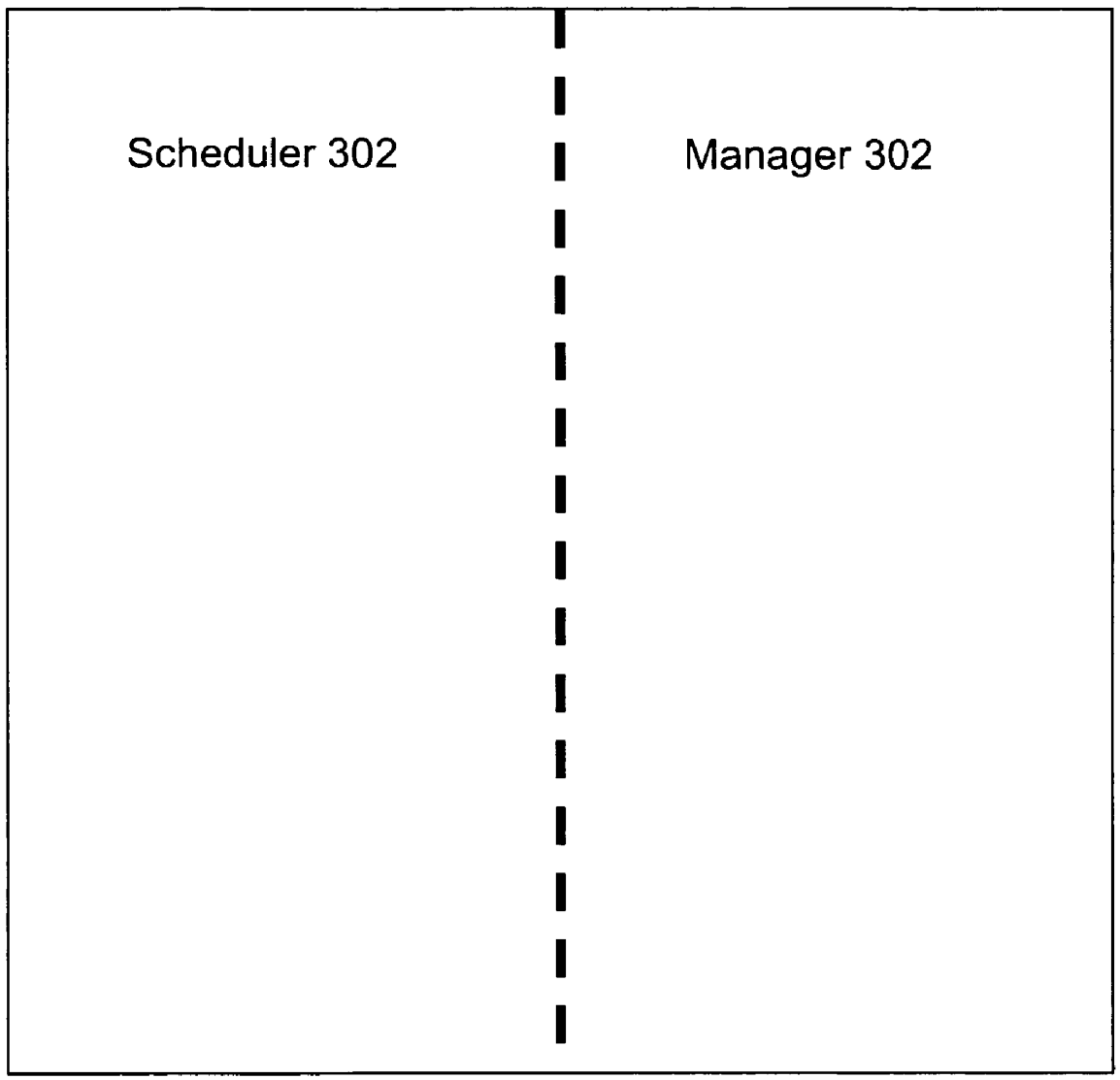
FIG. 3 illustrates a components of a workload manager of the job scheduler system of FIG. 1.

In FIG. 3, further detail on WM 102 is provided. WM 102 comprises scheduler 302 and manager 304. Scheduler 302 provides a database and scheduling routine to store tasks and defines a schedule and process for executing the stored tasks. Manager 304 evaluates conditions that have to be satisfied for execution of an element in the schedule and provides execution information in the form of publication information to PSS 104.

In defining a schedule for a job, such as job 200 (FIG. 2), a job graph associated with the job is defined and then converted into a series of subscriptions and publications. This conversion may be done using known publication/subscription conversion techniques known in the art.

Figure 4:
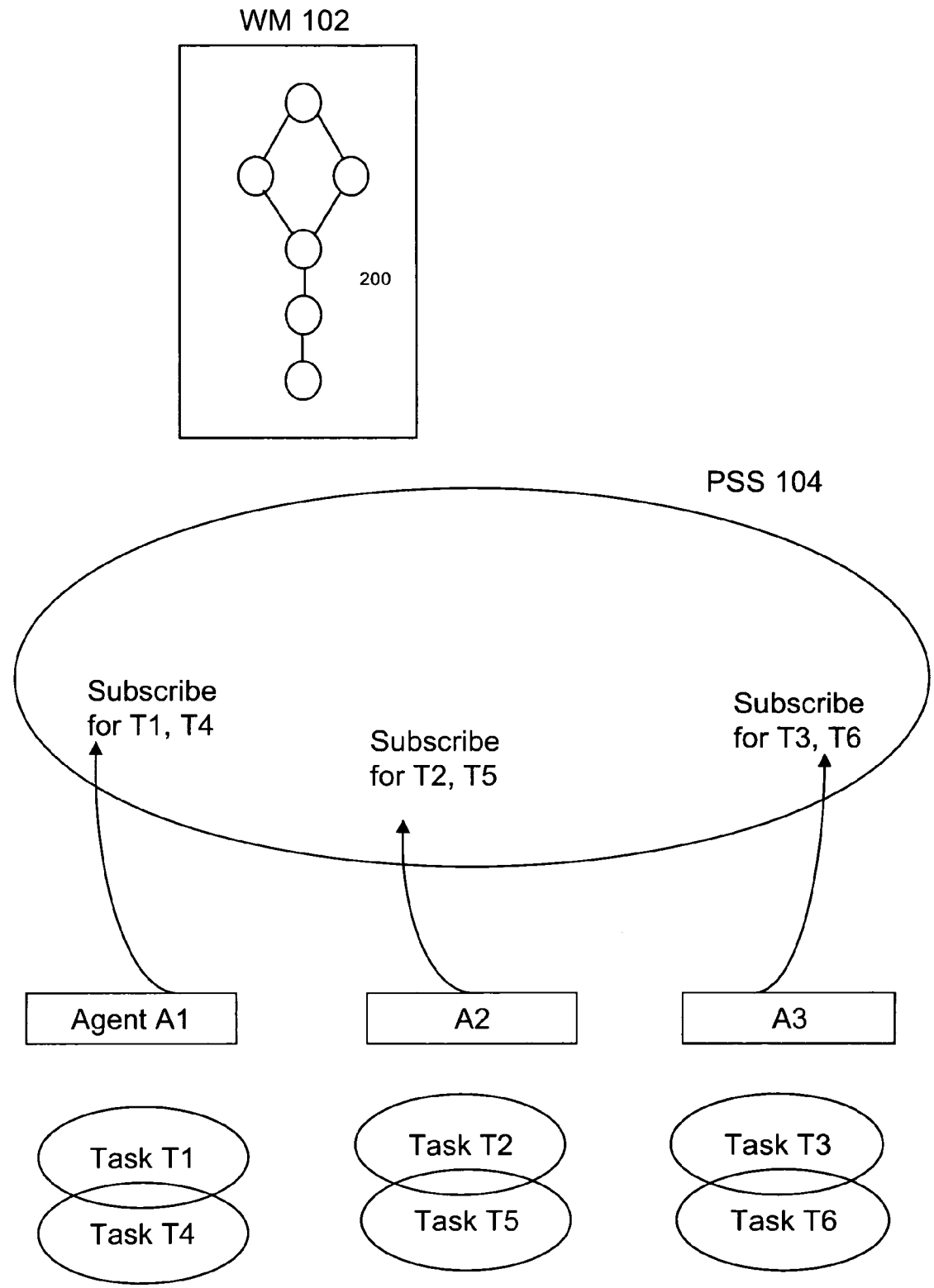
FIGS. 4-8 illustrate aspects of the job scheduler of FIG. 1 while processing the exemplary job of FIG. 2.
Figure 5:
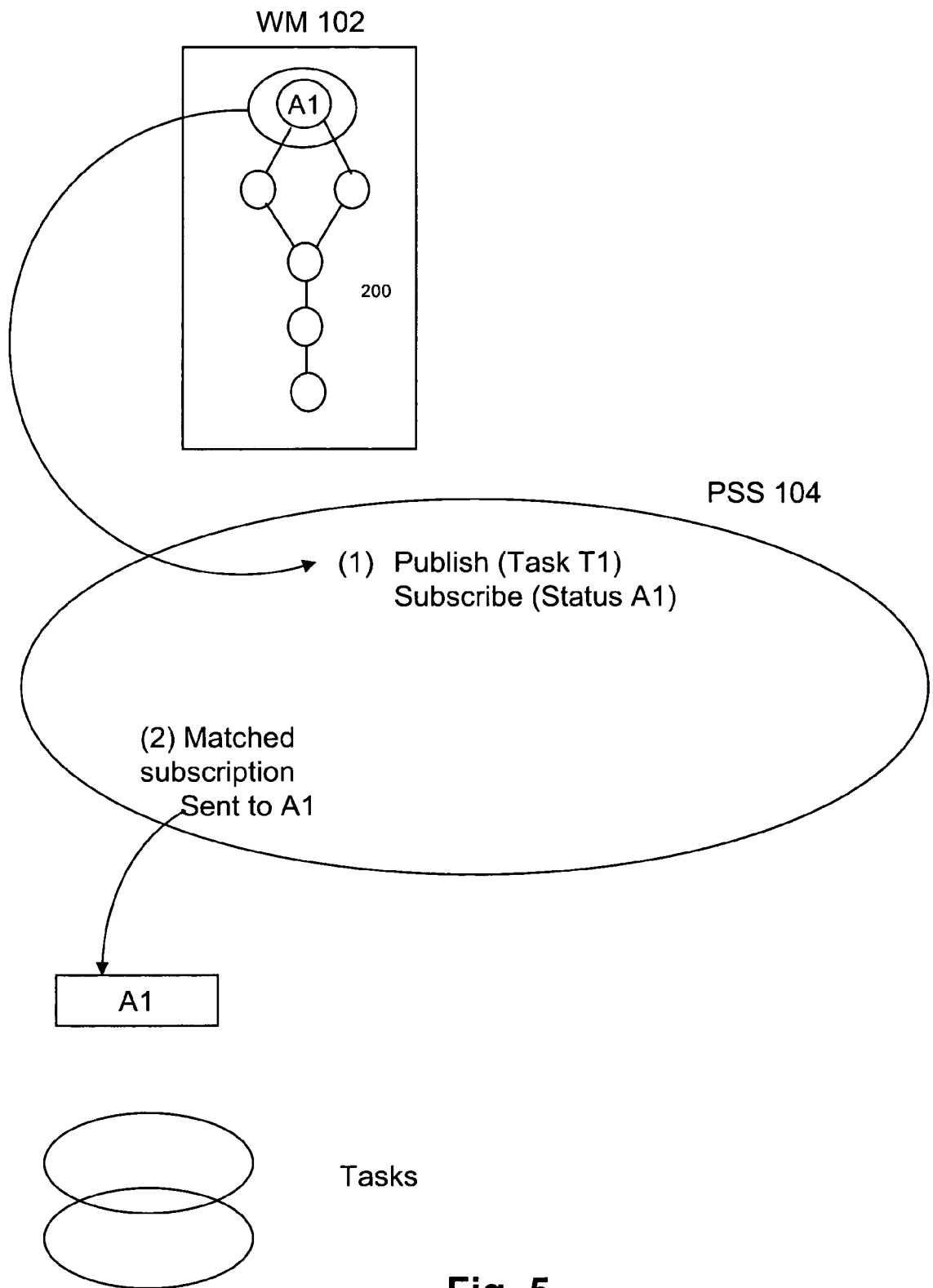
Figure 6:
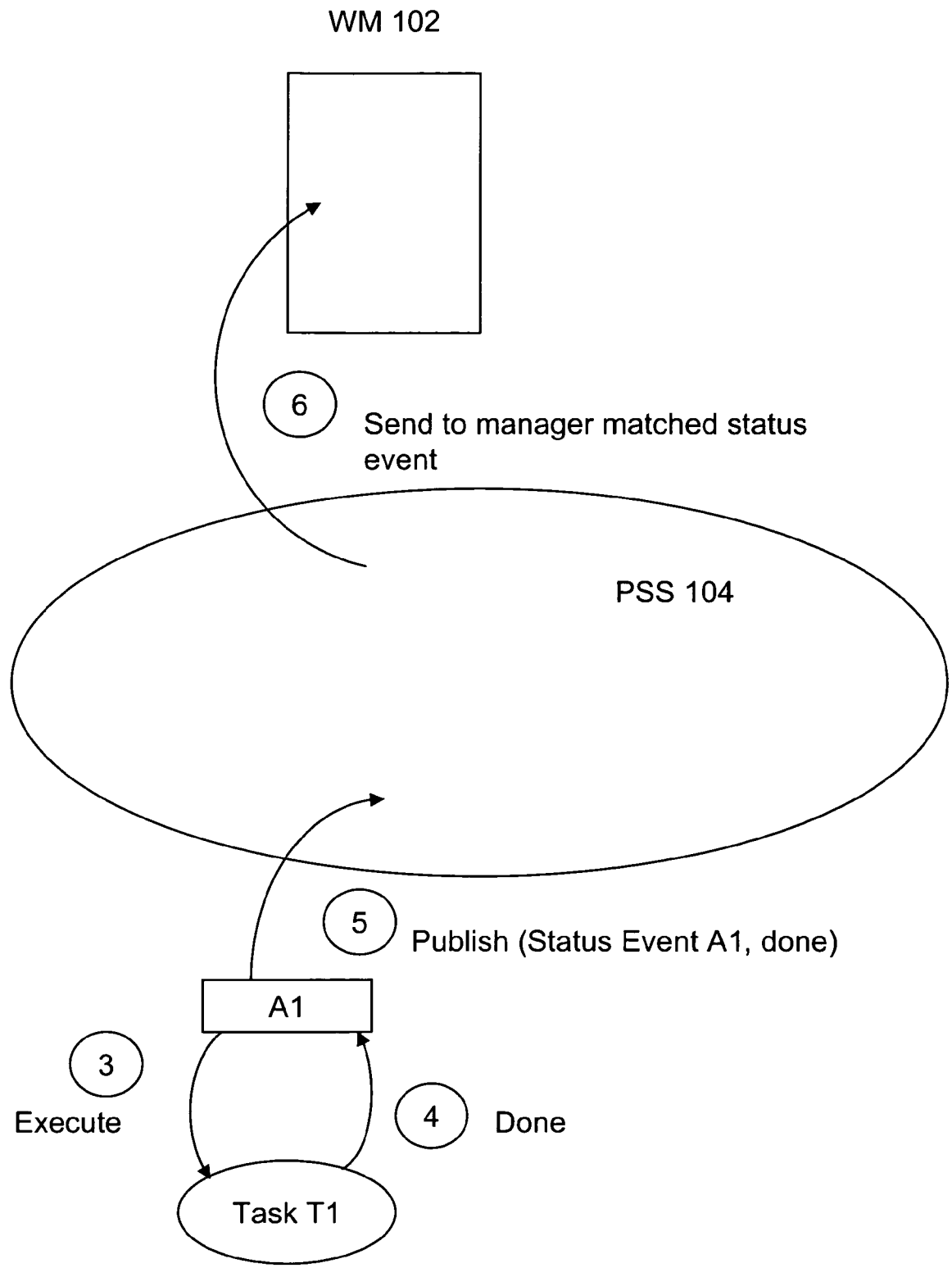
Figure 7:
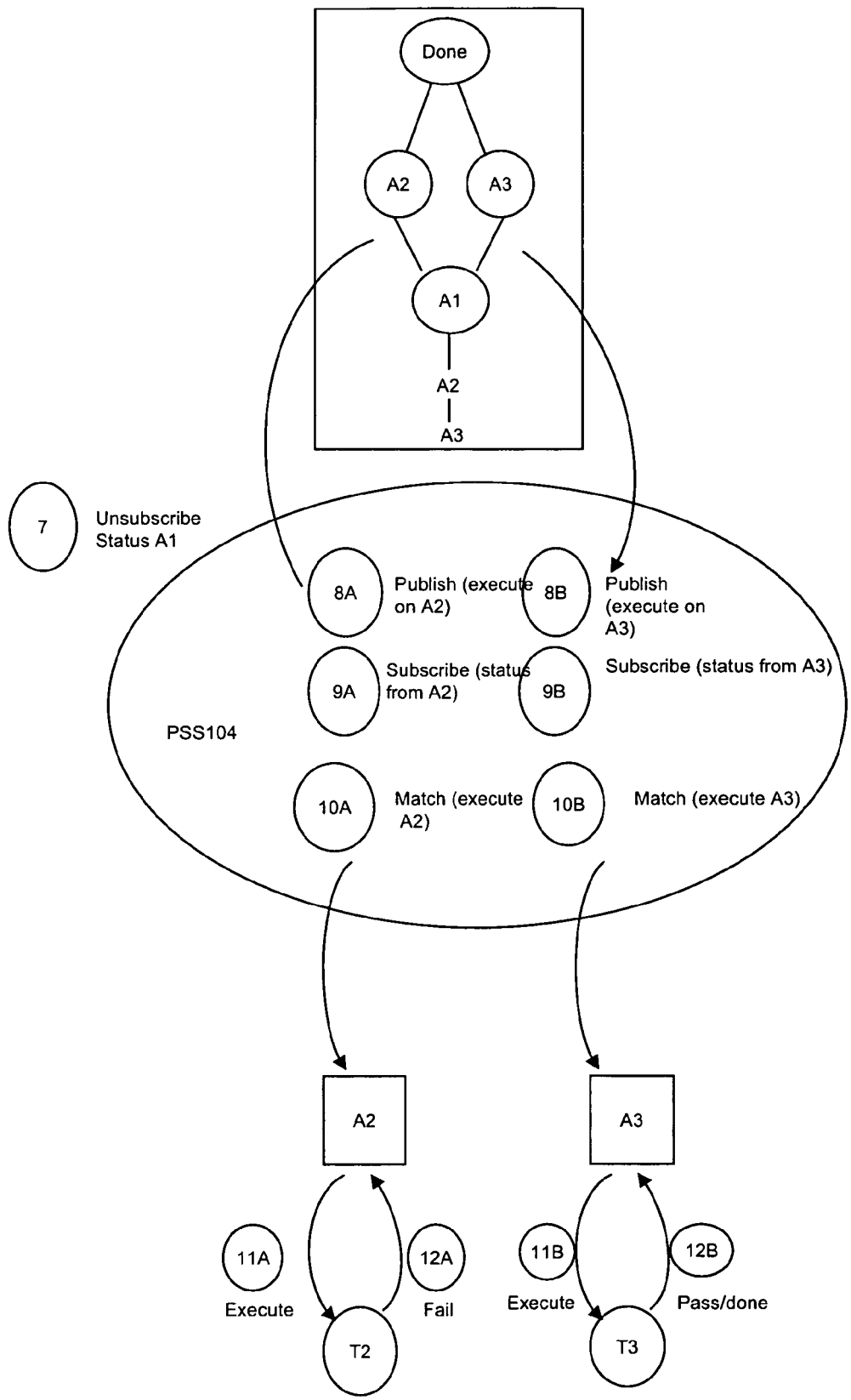
Figure 8:
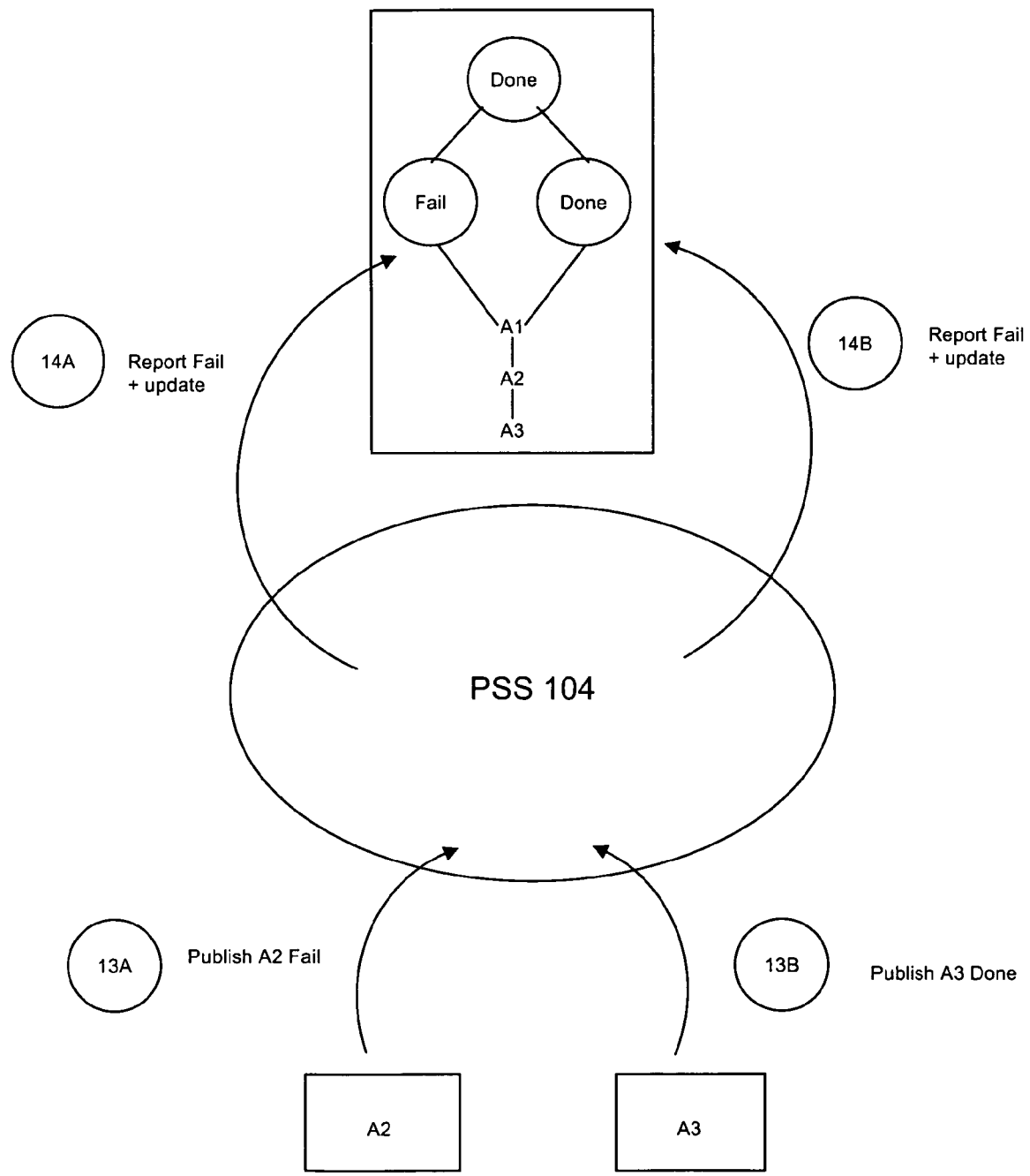
Figure 9:
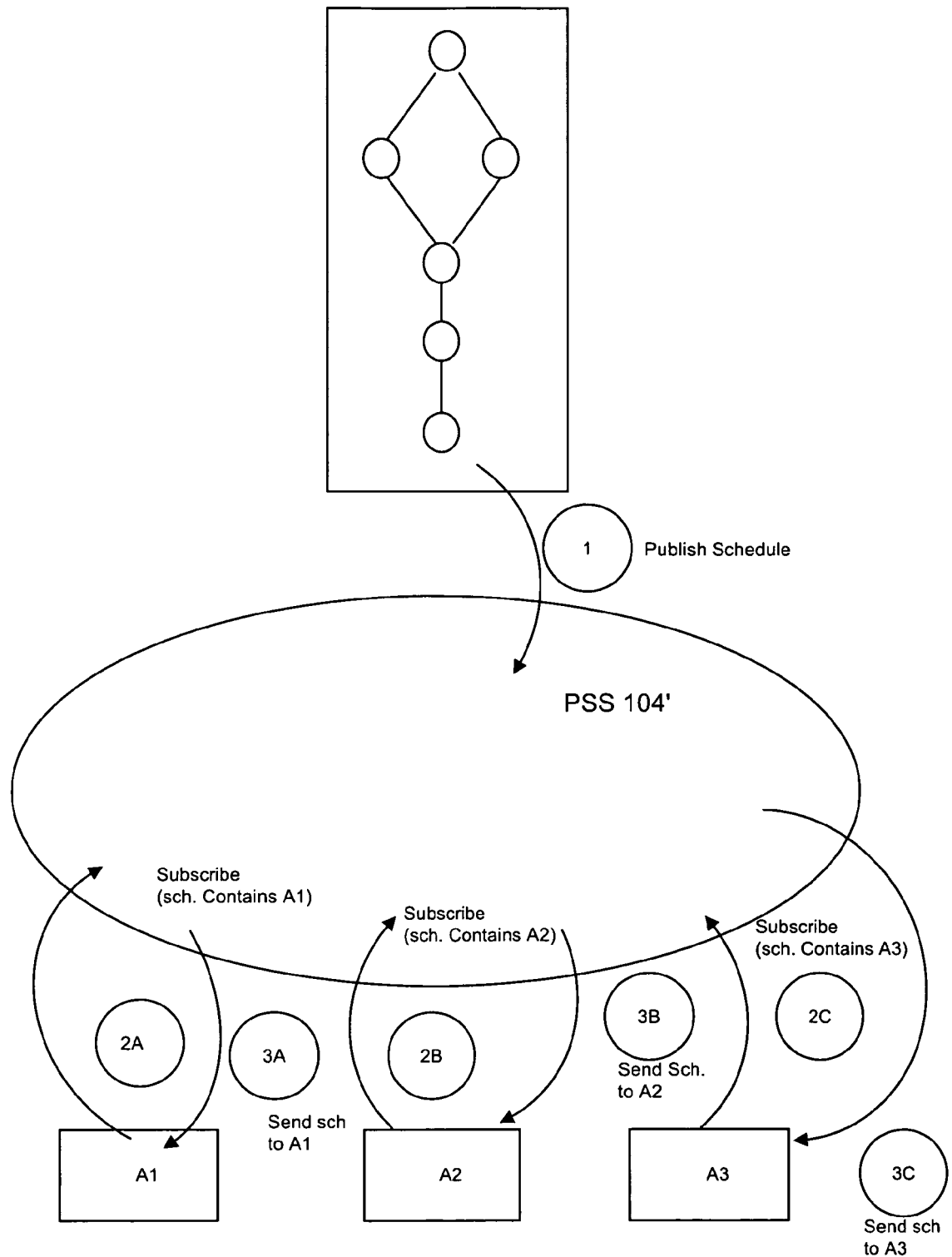
FIGS. 9-12 illustrate aspects of another embodiment of the job scheduler of FIG. 1 while processing a part of the exemplary job of FIG. 2.
Figure 10:
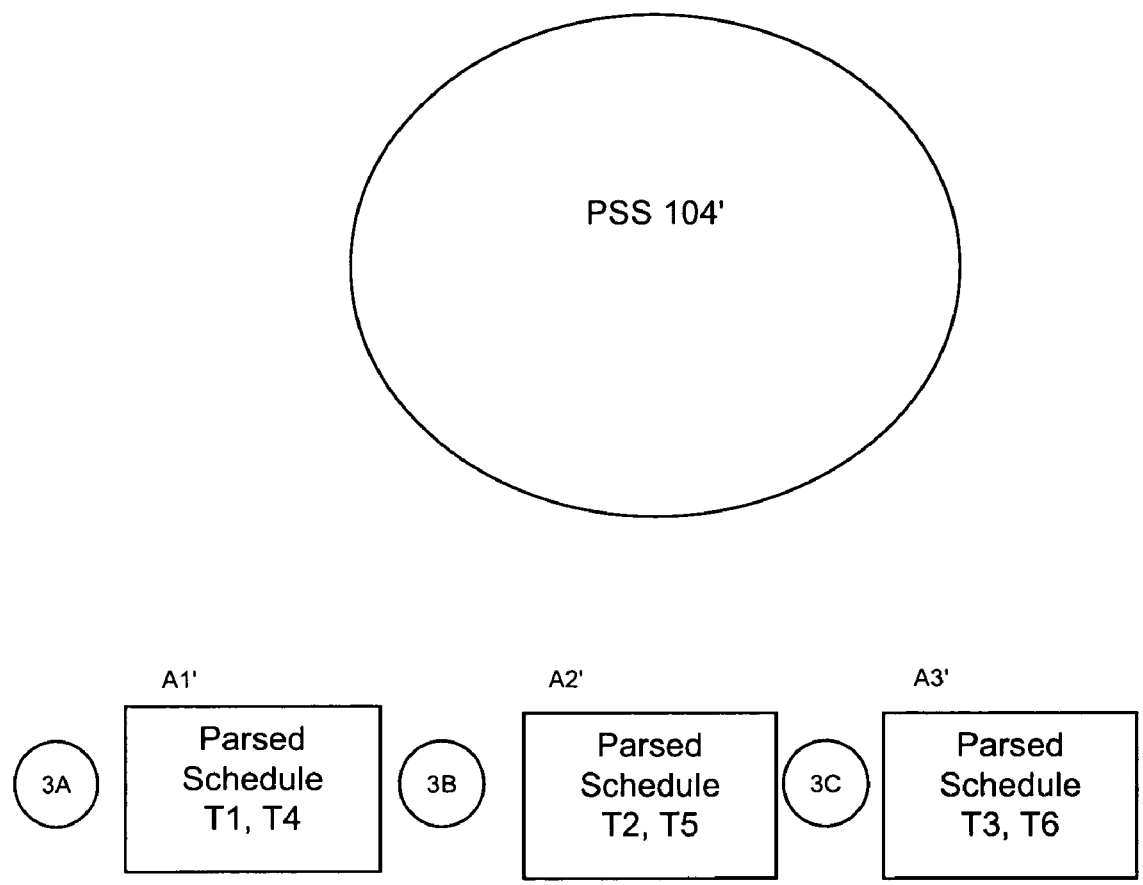
Figure 11:
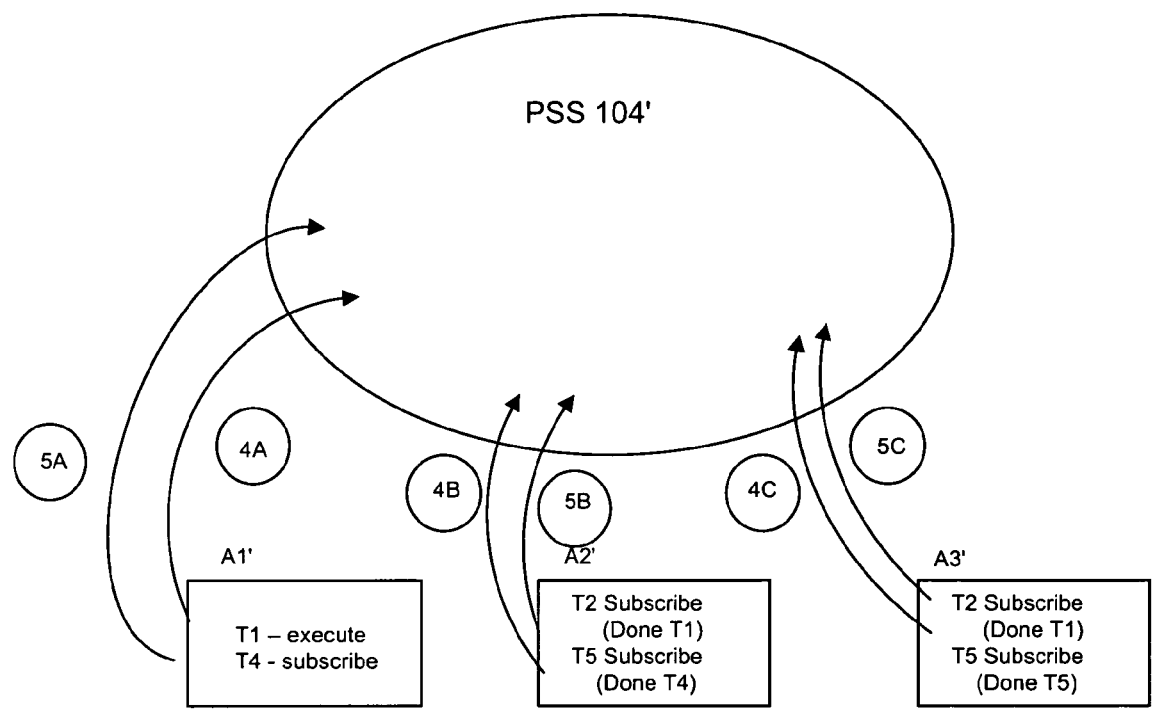
Figure 12:
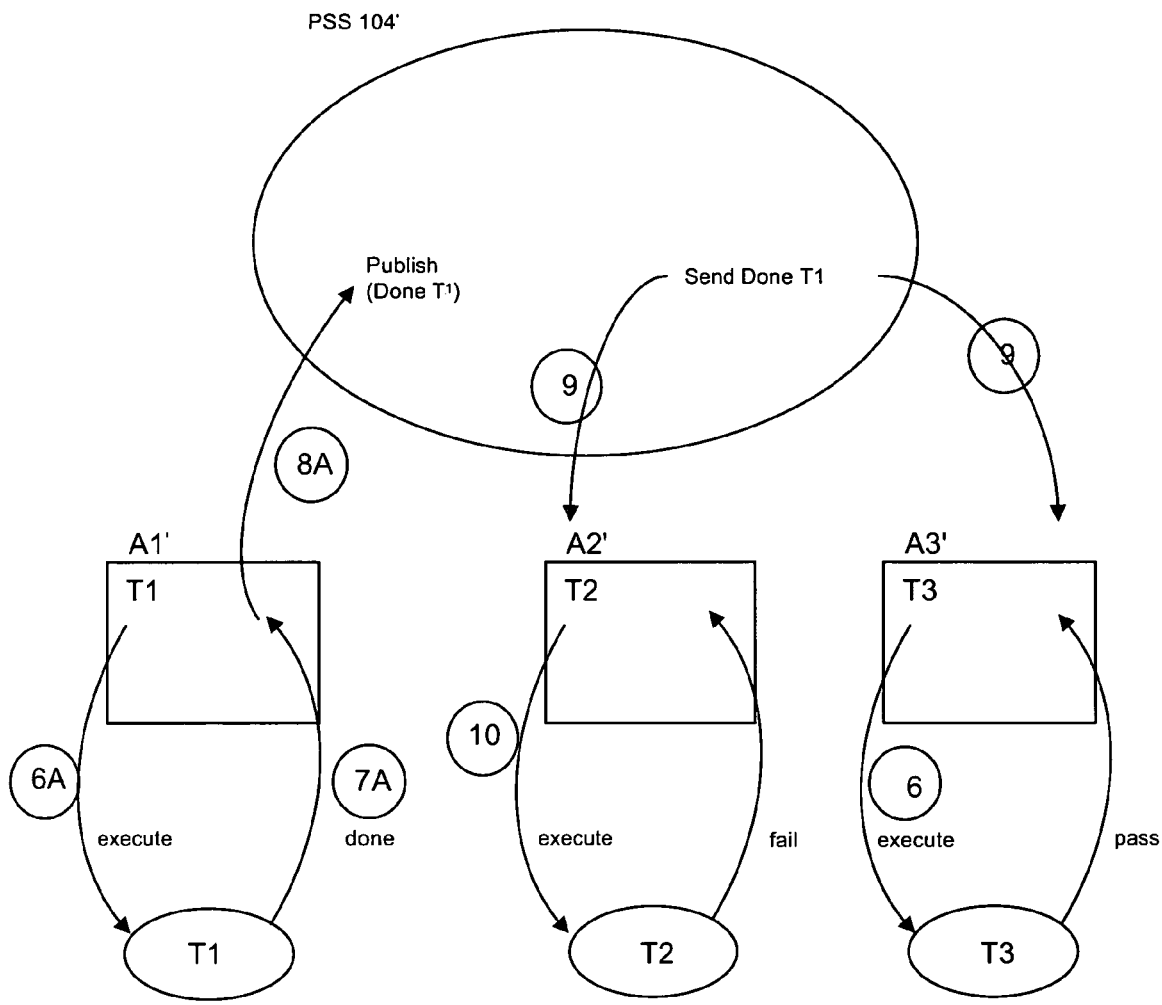

Referring to FIGS. 1-8 a description of an exemplary execution of job 200 is provided for the above noted configuration of WM 102. Referring to FIG. 4, at the first step, agents 106 each subscribe to PSS 104 for commands to execute. The software at each agent 106 identifies which command it needs to be triggered to activate. Meanwhile, scheduler 302 has a process schedule relating to job 200. The process schedule defines the relationships among the defined publications and subscriptions for job 200. Job 200 is typically activated by an activation trigger (such as a timer signal). Upon receiving the activation trigger, scheduler 302 creates a schedule relating to job 200 and sends it to manager 304.

When manager 304 receives the schedule, it starts execution of the schedule by publishing to PSS 104 a command to execute Task T1. PSS reviews a status list for tasks and can determine that agent A1 has subscribed to Task T1. As such, PSS 104 sends a command to agent A1 to execute Task T1.

When agent A1 receives this command, it sends a command to its target to execute task T1. In the example, task T1 is successfully completed by the target and sends agent A1 a "DONE" message. Subsequently, Agent A1 receives the "DONE TASK T1" message from the target. In response to receiving that message, it publishes a "DONE TASK T1" message to PSS 104. PSS 104 receives the message and checks it against its status list. As there is a match in the list for Task T1, PSS 104 then sends a "DONE TASK T1" message to manager 304. Next, manager 304 marks task T1 as completed and accordingly PSS 104 unsubscribes task T1 from A1.

For the next step, manager 304 consults the schedule and publishes commands to A2 and A3 to execute tasks T2 and T3. At the same time manager 304 subscribes to a status list in PSS 104 to receive messages from agents A2 and A3. PSS 104 sends messages execute tasks T2 and T3 to agents A2 and A3. Agents A2 and A3 receive the messages and send command to their respective targets to execute. In the example, target of agent A2 fails and sends failure indication to it. Meanwhile, target of agent A3 successfully completes and send a success message to agent A3. Upon receipt of the failure message, agent A2 publishes a corresponding failure message to PSS 104. As manager 304 has subscribed to messages from agent A2, PSS 104 sends a failure message to manager 304. Meanwhile, agent A3 publishes a success message to PSS 104 and PSS 104 sends a pass message to manager 304. Upon receipt of the each message, manager 304 marks task T2 for agent A2 as failed and task T3 for agent A3 as completed.

As task T2 has failed, in job 200, task T4 cannot be started. As such, the processing of job 200 ends without full completion. In other task arrangements, failure of some tasks may be tolerated.

Referring to FIGS. 1, 2 and 9-12, in another embodiment, functionality of manager 304 is ported into each agent 106. Agents A1, A2 and A3 subscribe to PSS 104 for schedules that contain their names. Meanwhile, scheduler 302 creates a schedule with assignment of tasks for agents A1, A2 and A3.

For the next step in processing job 200, scheduler 302 publishes the schedule for job 200 with PSS 104' and PSS 104' sends schedule to agents A1, A2 and A3, as they are identified in the schedule.

Next, agents A1', A2' and A3' each parse the received schedule and select tasks that identify them as the active agent.

In the next step, agents A1', A2' and A3' process their respective tasks. The agents identify external, internal and environmental conditions required by their respective tasks. Agent A1' is used for tasks T1 and T4. For task T1, agent 1 identifies that all conditions are met and accordingly, sends a command to its target to execute task T1. For task T4, agent A1' cannot execute it until successful completion of both tasks T2 and T3. As such, it subscribes to the status list for tasks T2 and T3. Meanwhile, agent A2 identifies external condition for tasks T2 (which depends on the successful completion of task T1) and task T5 (which depends on the successful completion of task T4). As there are outstanding conditions not yet met, neither task can be executed and subscribes to the status list for tasks T1 and T4. Agent A3' identifies external conditions of task T3 (which depends on successful completion of task T1) and task T6 (which depends on the successful completion of task T5). As there are outstanding conditions not yet met, neither task can be executed and agent A3' subscribes to the status list for tasks T3 and T5.

In operation, once task T1 completes execution, it sends a success indication to agent A1'. Agent A1' sends a success status message to PSS 104', which then identifies a match with any subscriptions wanted for agents A2' and A3'. Accordingly, PSS 104' sends status messages to agents A2' and A3'. Agents A2' and A3' receive the status messages and both identify that conditions for T1 are met. As such, each agent A2' and A3' sends a command to execute respective tasks T2 and T3.

Presuming successful completion of tasks T2 and T3, each task sends a success indication to their agents and each agent sends success status message to PSS 104'. PSS 104' then identifies a match with the subscription for agent A1'. Accordingly, PSS 104' sends status messages to agent A1'. Agent A1' receives the status messages and identifies that conditions for T4 are met. As such, agent A1' sends a command to execute task T4.

Presuming successful completion of task T4, it sends a success indication to agent A1 which then sends success status message to PSS 104'. PSS 104' then identifies a match with the subscription for agent A2. Accordingly, PSS 104' sends status messages to agent A2'. Agent A2' receives the status messages and identifies that conditions for T5 are met. As such, agent A2' sends a command to execute task T5.

Finally, presuming successful completion of task T5, it sends a success indication to agent A2' which then sends success status message to PSS 104'. PSS 104' then identifies a match with the subscription for agent A3'. Accordingly, PSS 104' sends status messages to agent A3'. Agent A3' receives the status messages and identifies that conditions for T6 are met. As such, agent A2' sends a command to execute task T6. Upon completion of task T6, agent A2' sends a status message to PSS 104', which then recognizes that job 200 is completed and sends a status message to scheduler 302'.

It will be appreciated that the order of scheduling, subscribing and reporting messages to and from PSS 104' and PSS 104 may be provided in any order, as long as the continuity of the scheduled job is maintained.

It will be further appreciated that other lists and messaging techniques may be implemented in either PSS 104 or its clients using techniques known in the art to achieve necessary synchronization of activation of tasks by the connected clients.

Although the invention has been described with reference to certain specific embodiments, various modifications thereof will be apparent to those skilled in the art without departing from the scope of the invention as outlines in the claims appended hereto. It will be further apparent to those skilled in the art that various embodiments of the invention may be made in hardware, firmware, software, or various combinations thereof. For example, various embodiments may be implemented in a computer readable storage medium containing computer executable instructions that can be read and executed on one or more processing devices. In particular, the computer readable storage medium may generally include any suitable mechanism for storing information in a form that can be read on a computer, including read only memory, random access memory, magnetic disk storage media, optical storage media, flash memory devices, or any other tangible media suitable for storing information. Additionally, while firmware, software, routines, or instructions may be described in the above disclosure in terms of specific exemplary embodiments and performing certain actions, it will be apparent that such descriptions are merely for the sake of convenience and that such actions in fact result from computing devices, processing devices, processors, controllers, or other devices executing the firmware, software, routines, or instructions.

I claim:

1. A method for job scheduling, comprising:
    defining a schedule that includes a plurality of commands that will execute a job comprising a first task, a second task, and a third task, wherein defining the schedule includes:
        converting a job graph defined for the job into a series of subscriptions and publications that a publish and subscription system uses to route the plurality of commands that will execute the job; and
        scheduling, by a workload manager, the first task for execution on a first computing device, the second task for execution on a second computing device, and the third task for execution on the first computing device;
    subscribing a first agent executing on the first computing device to the first task and subscribing a second agent executing on the second computing device to the second task;
    publishing a first command of the plurality of commands from the workload manager to the publish and subscription system in response to a scheduler receiving an activation trigger that initiates the execution of the job, wherein the publish and subscription system interfaces with the first agent executing on the first computing device and forwards the first command to the first agent in response to determining that the first agent has subscribed to the first task, and wherein the first agent executes the first task on the first computing device in response to receiving the first command from the publish and subscription system;
    unsubscribing the first agent from the first task in response to the publish and subscription system receiving a first publication from the first agent indicating that the execution of the first task on the first computing device succeeded;
    subscribing the first agent executing on the first computing device to the third task in response to unsubscribing the first agent from the first task;

publishing a second one of the plurality of commands from the workload manager to the publish and subscription system, which further interfaces with the second agent executing on the second computing device, wherein the publish and subscription system forwards the second command to the second agent in response to determining that the second agent has subscribed to the second task, and wherein the second agent executes the second task on the second computing device in response to receiving the second command from the publish and subscription system;

publishing a third one of the plurality of commands from the workload manager to the publish and subscription system that interfaces with the first agent executing on the first computing device, wherein the publish and subscription system forwards the third command to the first agent in response to determining that the first agent has subscribed to the third task, and wherein the first agent executes the third task on the first computing device in response to receiving the third command from the publish and subscription system;

receiving, at the publish and subscription system, a second publication from the second agent that indicates whether the execution of the second task succeeded or failed and a third publication from the first agent that indicates whether the execution of the third task succeeded or failed; and generating a message indicating that the execution of the job succeeded in response to the second publication received from the second agent indicating that the execution of the second task on the second computing device succeeded and the third publication received from the first agent further indicating that the execution of the third task on the first computing device succeeded.

2. The method of claim 1, wherein the workload manager provides the schedule that will execute the job to the publish and subscription system, the first agent subscribes to the first task in response to receiving the schedule from the publish and subscription system and extracting the first task from the schedule, and the second agent subscribes to the second task in response to receiving the schedule from the publish and subscription system and extracting the second task from the schedule.

3. The method of claim 1, wherein the second agent executing the second task on the second computing device and the first agent executing the third task on the first computing device occurs substantially simultaneously.

4. The method of claim 1, wherein the workload manager publishes the third command to the publish and subscription system in response to the first publication indicating that the execution of the first task succeeded or the second publication indicating that the execution of the second task succeeded, whereby the execution of the third task tolerates one of the execution of the first task failing or the execution of the second task failing.

5. The method of claim 1, wherein the message indicates that the execution of the job failed in response to the first publication indicating that the execution of the first task failed, the second publication indicating that the execution of the second task failed, or the third publication indicating that the execution of the third task failed.

6. The method of claim 1, wherein the message indicates that the execution of the job failed in response to the first publication indicating that the execution of the first task failed or the second publication indicating that the execution of the second task failed.

7. A system for job scheduling, comprising:
a plurality of computing devices that include a first computing device and a second computing device;
a workload manager configured to:
define a schedule that includes a plurality of commands to execute a job comprising a first task, a second task, and a third task;
convert a job graph defined for the job into a series of subscriptions and publications to route the plurality of commands to execute the job; and
schedule the first task for execution on the first computing device, the second task for execution on the second computing device, and the third task for execution on the first computing device;
a scheduler configured to initiate execution of the job; and
a publish and subscription system that interfaces with a first agent executing on the first computing device and a second agent executing on the second computing device, wherein the publish and subscription system is configured to use the series of subscriptions and publications converted from the job graph to:
subscribe the first agent executing on the first computing device to the first task and the second agent executing on the second computing device to the second task;
forward a first one of the plurality of commands to the first agent subscribed to the first task in response to the workload manager publishing the first command to the publish and subscription system, wherein the first agent is configured to execute the first task on the first computing device in response to receiving the first command from the publish and subscription system and the workload manager is further configured to publish the first command to the publish and subscription system in response to the scheduler receiving an activation trigger to initiate the execution of the job;
unsubscribe the first agent from the first task in response to receiving a first publication from the first agent indicating that the execution of the first task on the first computing device succeeded;
subscribe the first agent executing on the first computing device to the third task in response to unsubscribing the first agent from the first task;
forward a second one of the plurality of commands to the second agent subscribed to the second task in response to the workload manager publishing the second command to the publish and subscription system, wherein the second agent is configured to execute the second task on the second computing device in response to receiving the second command from the publish and subscription system;
forward a third one of the plurality of commands to the first agent subscribed to the third task in response to the workload manager publishing the third command to the publish and subscription system, wherein the first agent is further configured to execute the third task on the first computing device in response to receiving the third command from the publish and subscription system;
receive a second publication from the second agent that indicates whether the execution of the second task succeeded or failed and a third publication from the first agent that indicates whether the execution of the third task succeeded or failed;
generate a message indicating that the execution of the job succeeded in response to the second publication received from the second agent indicating that the execution of the second task on the second computing device succeeded and the third publication received from the first agent indicating that the execution of the third task on the first computing device succeeded.

8. The system of claim 7, wherein the publish and subscription system is configured to subscribe the first agent to the first task and the second agent to the second task in response to receiving the schedule to execute the job from the workload manager and forwarding the schedule to the first agent and the second agent, and further in response to the first agent extracting the first task from the schedule and the second agent extracting the second task from the schedule.

9. The system of claim 7, wherein the second agent and first agent are respectively configured to execute the second task on the second computing device and the third task on the first computing device substantially simultaneously.

10. The system of claim 7, wherein the workload manager is further configured to publish the third command to the publish and subscription system in response to the first publication indicating that the execution of the first task succeeded or the second publication indicating that the execution of the second task succeeded, whereby the execution of the third task tolerates one of the execution of the first task failing or the execution of the second task failing.

11. The system of claim 7, wherein the message indicates that the execution of the job failed in response to the first publication indicating that the execution of the first task failed, the second publication indicating that the execution of the second task failed, or the third publication indicating that the execution of the third task failed.

12. The system of claim 7, wherein the message indicates that the execution of the job failed in response to the first publication indicating that the execution of the first task failed or the second publication indicating that the execution of the second task failed.

13. A method for job scheduling, comprising:
scheduling, at a workload manager, a job that includes a first task to be executed on a first computing device, a second task to be executed on a second computing device, and a third task to be executed on the first computing device, wherein scheduling the job includes converting a job graph into a series of subscriptions and publications that a publish and subscription system will use to route commands to execute the scheduled job;
subscribing a first agent executing on the first computing device to the first task and a second agent executing on the second computing device to the second task;
publishing a first command associated with the scheduled job from the workload manager to the publish and subscription system in response to a scheduler receiving an activation trigger to initiate executing the scheduled job, wherein the publish and subscription system forwards the first command to the first agent subscribed to the first task to cause the first agent to execute the first task on the first computing device;
unsubscribing the first agent from the first task in response to the publish and subscription system receiving a first publication from the first agent indicating that the first task was successfully executed on the first computing device;
subscribing the first agent executing on the first computing device to the third task in response to unsubscribing the first agent from the first task;
publishing a second command associated with the scheduled job from the workload manager to the publish and subscription system, wherein the publish and subscription system forwards the second command to the second agent subscribed to the second task to cause the second agent to execute the second task on the second computing device;
publishing a third command associated with the scheduled job from the workload manager to the publish and subscription system, wherein the publish and subscription system forwards the third command to the first agent subscribed to the third task to cause the first agent to execute the third task on first second computing device; and
generating a message indicating whether the job was successfully executed in response to receiving a second publication from the second agent that indicates whether the second task was successfully executed and a third publication from the first agent that indicates whether the third task was successfully executed, wherein the message indicates that the job was successfully executed if the second publication indicates that the second agent successfully executed the second task and the third publication indicates that the first agent successfully executed the third task.

14. The method of claim 13, further comprising:
providing the job graph from the workload manager to the publish and subscription system; and
forwarding the job graph from the publish and subscription system to the first agent and the second agent, wherein converting the job graph into the series of subscriptions and publications includes the first agent extracting the first task and the third task from the forwarded job graph to subscribe to the first task and the third task and the second agent extracting the second task from the forwarded job graph to subscribe to the second task.

15. The method of claim 13, wherein the second agent and the first agent execute the second task and the third task substantially simultaneously.

16. The method of claim 13, wherein the workload manager publishes the third command to the publish and subscription system if the first publication indicates that the first task was successfully executed or the second publication indicates that the second task was successfully executed, whereby the first agent executes the third task in a manner that tolerates either the first task or the second task failing to successfully execute.

17. The method of claim 13, wherein the message indicates that the job failed to successfully execute if the first publication indicates that the first task failed to successfully execute, the second publication indicates that the second task failed to successfully execute, or the third publication indicates that the third task failed to successfully execute.

18. The method of claim 13, wherein the message indicates that the job failed to successfully execute if the first publication indicates that the first task failed to successfully execute or the second publication indicates that the second task failed to successfully execute.

19. A system for job scheduling, comprising:
a computer configured to run a workload manager to schedule a job using a series of subscriptions and publications converted from a job graph, wherein the scheduled job includes a first task to be executed on a first computing device, a second task to be executed on a second computing device, and a third task to be executed on the first computing device; and
a publish and subscription server configured to use the series of subscriptions and publications converted from the job graph to route commands to execute the scheduled job, wherein to use the series of subscriptions and publications to execute the scheduled job, the publish and subscription server is further configured to:

subscribe a first agent executing on the first computing device to the first task and a second agent executing on the second computing device to the second task;

forward a first command associated with the scheduled job to the first agent subscribed to the first task to cause the first agent to execute the first task on the first computing device, wherein the computer is further configured to run the workload manager to publish the first command to the publish and subscription server in response to a scheduler receiving an activation trigger to initiate executing the scheduled job;

unsubscribe the first agent from the first task in response to receiving a first publication from the first agent indicating that the first task was successfully executed on the first computing device;

subscribe the first agent executing on the first computing device to the third task in response to unsubscribing the first agent from the first task;

forward a second command associated with the scheduled job to the second agent subscribed to the second task to cause the second agent to execute the second task on the second computing device in response to the workload manager publishing the second command to the publish and subscription server;

forward a third command associated with the scheduled job to the first agent subscribed to the third task to cause the first agent to execute the third task on the first computing device in response to the workload manager publishing the third command to the publish and subscription server; and generate a message indicating whether the job was successfully executed in response to receiving a second publication from the second agent that indicates whether the second task was successfully executed and a third publication from the first agent that indicates whether the third task was successfully executed, wherein the message indicates that the job was successfully executed if the second publication indicates that the second agent successfully executed the second task and the third publication indicates that the first agent successfully executed the third task.

20. The system of claim 19, wherein the publish and subscription server is further configured to:

receive the job graph from the workload manager; and forward the job graph to the first agent and the second agent, wherein the workload manager is configured to convert the job graph into the series of subscriptions and publications in response to the first agent extracting the first task and the third task from the forwarded job graph to subscribe to the first task and the third task, and further in response to the second agent extracting the second task from the forwarded job graph to subscribe to the second task.

21. The system of claim 19, wherein the second agent and the first agent are configured to execute the second task and the third task substantially simultaneously.

22. The system of claim 19, wherein the workload manager is configured to publish the third command to the publish and subscription server if the first publication indicates that the first task was successfully executed or the second publication indicates that the second task was successfully executed, whereby the first agent is configured to execute the third task in a manner that tolerates either the first task or the second task failing to successfully execute.

23. The system of claim 19, wherein the message indicates that the job failed to successfully execute if the first publication indicates that the first task failed to successfully execute, the second publication indicates that the second task failed to successfully execute, or the third publication indicates that the third task failed to successfully execute.

24. The system of claim 19, wherein the message indicates that the job failed to successfully execute if the first publication indicates that the first task failed to successfully execute or the second publication indicates that the second task failed to successfully execute.

* * * * *